(12) United States Patent
Rao et al.

(10) Patent No.: US 9,179,195 B2
(45) Date of Patent: Nov. 3, 2015

(54) SEARCHING ELECTRONIC PROGRAM GUIDE DATA

(75) Inventors: Pradhan S Rao, Sunnyvale, CA (US); David Hendler Sloo, Menlo Park, CA (US); Daniel Danker, Sunnyvale, CA (US); George K Nyako, Santa Clara, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1269 days.

(21) Appl. No.: 11/012,471

(22) Filed: Dec. 15, 2004

(65) Prior Publication Data
US 2006/0130098 A1 Jun. 15, 2006

(51) Int. Cl.
*H04N 21/482* (2011.01)
*H04N 5/445* (2011.01)
*H04N 7/16* (2011.01)
*H04N 21/84* (2011.01)

(52) U.S. Cl.
CPC ....... *H04N 21/4828* (2013.01); *H04N 5/44543* (2013.01); *H04N 7/163* (2013.01); *H04N 21/482* (2013.01); *H04N 21/84* (2013.01)

(58) Field of Classification Search
CPC . H04N 21/482; H04N 5/44543; H04N 21/84; H04N 21/4828; H04N 21/4826
USPC ..................................................... 725/37–61
See application file for complete search history.

(56) References Cited

U.S. PATENT DOCUMENTS

| | | | | |
|---|---|---|---|---|
| 5,191,423 A * | 3/1993 | Yoshida | ........................... | 725/57 |
| 6,216,264 B1 * | 4/2001 | Maze et al. | ...................... | 725/52 |
| 6,651,253 B2 * | 11/2003 | Dudkiewicz et al. | ......... | 725/114 |
| 6,763,522 B1 * | 7/2004 | Kondo et al. | .................... | 725/39 |
| 6,766,526 B1 * | 7/2004 | Ellis | ................................ | 725/52 |
| 6,772,433 B1 * | 8/2004 | LaJoie et al. | ..................... | 725/52 |
| 7,073,193 B2 * | 7/2006 | Marsh | ............................ | 725/114 |
| 7,076,202 B1 * | 7/2006 | Billmaier | ..................... | 455/3.04 |
| 7,096,483 B2 * | 8/2006 | Johnson | .......................... | 725/53 |
| 7,213,256 B1 * | 5/2007 | Kikinis | ............................ | 725/53 |
| 7,224,409 B2 * | 5/2007 | Chin et al. | ..................... | 348/732 |
| 7,373,652 B1 * | 5/2008 | Bayrakeri et al. | .............. | 725/53 |
| 7,506,350 B2 * | 3/2009 | Johnson | .......................... | 725/53 |
| 7,836,466 B2 * | 11/2010 | Marsh | ............................. | 725/39 |
| 8,010,980 B1 * | 8/2011 | Mohr et al. | .................... | 725/48 |
| 8,365,221 B2 * | 1/2013 | Schlarb et al. | .................. | 725/45 |

(Continued)

FOREIGN PATENT DOCUMENTS

GB    2340633 A  *  2/2000  ............. H04N 7/088

OTHER PUBLICATIONS

European Office Action mailed Apr. 25, 2013 for European patent application No. 05111640.8, a counterpart foreign application of U.S. Appl. No. 11/012,471, 4 pages.

(Continued)

*Primary Examiner* — Ricky Chin (74) *Attorney, Agent, or Firm* — Micah P. Goldsmith; Judy Yee; Micky Minhas (57) ABSTRACT

Searching electronic program guide (EPG) data is described. The EPG data may be compartmentalized into channel metadata that describes characteristics of one or more channels and content metadata that describes characteristics of one or more content items. In a implementation, a method includes searching channel metadata and content metadata. A result of the searching is formed for output in conjunction with an electronic program guide (EPG).

43 Claims, 6 Drawing Sheets

(56) References Cited

U.S. PATENT DOCUMENTS

| | | |
|---|---|---|
| 2001/0029610 A1* | 10/2001 | Corvin et al. ............... 725/42 |
| 2003/0028884 A1* | 2/2003 | Swart et al. ................. 725/51 |
| 2003/0093790 A1 | 5/2003 | Logan et al. |
| 2003/0163823 A1 | 8/2003 | Logan et al. |
| 2003/0208763 A1 | 11/2003 | McElhatten et al. |
| 2003/0229900 A1 | 12/2003 | Reisman |
| 2004/0078807 A1* | 4/2004 | Fries et al. ................. 725/14 |
| 2004/0168184 A1* | 8/2004 | Steenkamp et al. ......... 725/31 |
| 2004/0194141 A1* | 9/2004 | Sanders ..................... 725/53 |
| 2004/0221308 A1 | 11/2004 | Cuttner et al. |
| 2005/0204387 A1* | 9/2005 | Knudson et al. ............ 725/52 |
| 2005/0246739 A1* | 11/2005 | Davidson .................... 725/45 |
| 2006/0026638 A1* | 2/2006 | Stark et al. .................. 725/38 |
| 2006/0041910 A1* | 2/2006 | Hatanaka et al. ........... 725/58 |
| 2007/0067801 A1* | 3/2007 | Monta et al. ................ 725/44 |
| 2007/0277201 A1* | 11/2007 | Wong et al. ................. 725/40 |
| 2008/0005651 A1* | 1/2008 | Grefenstette et al. ....... 715/500 |
| 2009/0006543 A1* | 1/2009 | Smit ........................... 709/203 |
| 2009/0228912 A1* | 9/2009 | Reynolds et al. ............ 725/25 |
| 2010/0031193 A1* | 2/2010 | Stark et al. .................. 715/810 |
| 2011/0173664 A1* | 7/2011 | Knudson ..................... 725/46 |

OTHER PUBLICATIONS

Canadian Office Action mailed Jan. 23, 2013 for Canadian patent application No. 2529969, a counterpart foreign application of U.S. Appl. No. 11/012,471, 3 pages.

Canadian Office Action mailed Feb. 7, 2014 for Canadian patent application No. 2529969, a counterpart foreign application of U.S. Appl. No. 11/012,471, 2 pages.

Indian Office Action mailed Dec. 2, 2014 for Indian Patent Application No. 3253/DEL/2005, a counterpart foreign application of U.S. Appl. No. 11/012,471, 2 pages.

* cited by examiner

SEARCHING ELECTRONIC PROGRAM GUIDE DATA

TECHNICAL FIELD

The present invention generally relates to the field of content navigation and more particularly relates to searching electronic program guide data.

BACKGROUND

Users have access to an ever increasing variety of content that may be output in a wide variety of ways. For example, a user may view traditional television programming received over a network by using a client, such as a set-top box. The user may also view pay-per-view movies, order video-on-demand (VOD) content, interact with a video game, play music, and so on. The user may also access content locally on the client, such as from a digital video disc (DVD), broadcast content stored on a hard disk drive for viewing in the future (e.g., a digital video recorder), and so on.

To navigate through this ever increasing variety of content, the user may interact with user interface which displays representations of the content, such as an electronic program guide (EPG). For example, the EPG may enable the user to observe a listing of television programs that are currently being streamed, as well as a listing of television programs that will be streamed in the future. Additionally, the EPG may allow the user to navigate to a television program from the EPG itself. For instance, the user may select a representation of a television program to cause the client to tune to that television program.

Traditionally, an EPG is configured to locate particular content items of interest, such as a particular television program. However, content may also be known by the name of the provider instead of by the name of the content itself. For instance, a user may want to watch the "Weather Channel" and not know the name of any particular content item that is available via the Weather Channel. A traditional EPG, however, does not address the channels themselves and rather is focused on the content items that are available via the channels.

Therefore, there is a continuing need for searching of electronic program guide (EPG) data that addresses channels and channel characteristics.

SUMMARY

Searching EPG data is described. In an implementation, EPG data includes content metadata that describes characteristics of a respective one of a plurality of content items, such as content title, actors, genre, and so on. EPG data also includes channel metadata that describes characteristics respective channels, such as call sign, channel name, and so on. A search may be performed on both the content and channel metadata to locate content items and channels, respectively, which correspond to a search request. Thus, in this example, a single search may be performed to locate both channels and content items. In another example, the search may be performed to locate a particular channel without also searching for corresponding content items.

BRIEF DESCRIPTION OF THE DRAWINGS

The same reference numbers are utilized in instances in the discussion to reference like structures and components.

DETAILED DESCRIPTION

Overview

Searching electronic program guide (EPG) data is described. In an implementation, functionality is provided to search for channels as well as content items that are available via the channels. For example, a user may enter a search request having the alphabetic characters "STA". EPG data may be configured to include content metadata that describes characteristics of content items (e.g., title, detailed description, and so on) and channel metadata that describes characteristics of channels (e.g., call sign, channel name, and so on). Both the content metadata and the channel metadata are searched in response to the request. For instance, the search "STA" may locate a "Star Gazing" channel and a television program titled "Stars of Hollywood". In this way, the user is provided with a single, integrated search of the EPG data that addresses both channels and content items. Further discussion of EPG data searching may be found beginning in relation to FIG. 1.

The search request may be entered in a variety of ways. For example, an EPG may be provided which includes representations of a plurality of content items (e.g., television programs) and a search window. The user may utilize an input device (e.g., a remote control) to enter text into the search window to search the EPG data. In another example, the user may highlight a channel identifier in the EPG and then enter text via the input device. As the user enters the text, the EPG may be configured to automatically scroll to the channel that matches the entered text. Further discussion of entering a search request may be found in relation to FIGS. 4 and 5.

Exemplary Environment

Figure 1:
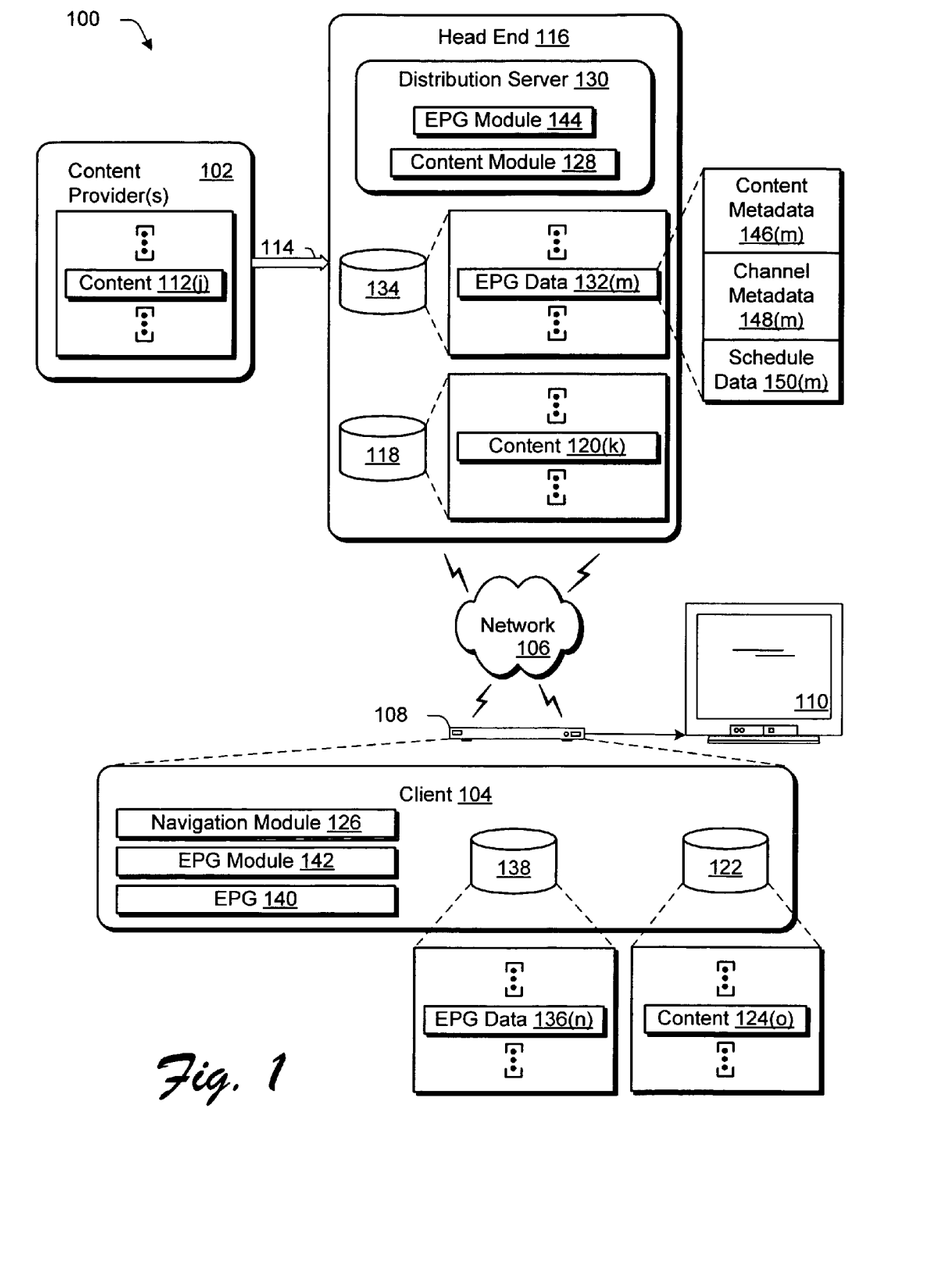
FIG. 1 is an illustration of an environment in an exemplary implementation that includes a content provider that is communicatively coupled to a client over a network.

FIG. 1 is an illustration of an environment 100 in an exemplary implementation that includes a content provider 102 that is communicatively coupled to a client 104 over a network 106. The client 104 may be configured in a variety of ways. For example, the client 104 may be configured as a computing device that is capable of communicating over the network 106, such as a desktop computer, a mobile station, an entertainment appliance, a set-top box 108 communicatively coupled to a display device 110 as illustrated, a wireless phone, and so forth. The client 104 may range from a full resource device with substantial memory and processor resources (e.g., television enabled personal computers, television recorders equipped with hard disk) to a low-resource device with limited memory and/or processing resources (e.g., traditional set-top boxes). The client 104 may also relate to a person and/or entity that operates the client. In other words, client 104 may describe a logical client that includes a user and/or a machine. Although one client 104 is illustrated, a plurality of clients may be communicatively coupled to the network 106. Likewise, although one content provider 102 is illustrated, a plurality of content providers may also be included in the environment 100. The network 106 is illustrated as the Internet, and may include a variety of other networks, such as an intranet, a wired or wireless telephone network, a broadcast network which may include a backchannel to provide two-way communication, and so forth.

The content provider 102 includes a plurality of content 112(j), where "j" can be any integer from 1 to "J". The content 112(j) may include a variety of data, such as streaming content (e.g., television programming and pay-per-view movies), one or more results of remote application processing, and so on. The content 112(j) is communicated over a network 114 to a head end 116. The network 114 may be the same as or different from network 106. For example, the network 114 may be configured as a private subnet while the network 106 is configured as the Internet.

Content 112(j) communicated from the content provider 102 over the network 114 is received by the head end 116 and stored in a content database 118 as content 120(k), where "k" can be any integer from "1" to "K". The content 120(k) may be the same as or different from the content 112(j) received from the content provider 102. The content 120(k), for instance, may include additional data for streaming to the client 104, may be compressed using one or more data compression techniques by the head end 116, may be encrypted, and so forth.

The client 104 may be configured in a variety of ways to receive the content 120(k) over the network 106. As illustrated, the client 104 may be configured as a set-top box 108 that is communicatively coupled to a display device 110. The client 104 includes hardware and software to transport and decrypt content 120(k) received from the head end 116 for rendering by the display device 110. Although a display device 110 is shown, a variety of other output devices are also contemplated, such as speakers.

The client 104 may also include digital video recorder (DVR) functionality. For instance, the client 104 may include a database 122 to record the content 120(k) received from the network 106. The database 122 may be implemented in a variety of ways, such as a hard disk drive, a removable computer-readable medium (e.g., a writable digital video disc), and so on. Content 124(o), where "o" can be any number from one to "O", that is stored in the database 122 of the client 104 may be copies of the content 120(k) that was streamed from the head end 116. Additionally, content 124(o) may represent content obtained from a variety of other sources, such as from a computer-readable medium (e.g., a digital video disc) that is accessible by the client 104.

The client 104 includes a navigation module 126 that is executable on the client 104 to control content playback on the client 104, such as through the use of one or more "trick modes". The trick modes may provide non-linear playback of the content 124(o) (i.e., time shift the playback of the content 124(o)) such as pause, rewind, fast forward, slow motion playback, and the like. For example, during a pause, the client 104 may continue to record the content 120(k) in the database 122 as content 124(o). The client 104, through execution of the navigation module 126, may then playback the content 124(o) from the database 122, starting at the point in time the content 124(o) was paused, while continuing to record the currently-broadcast content 120(k) in the database 122 from the head end 116.

When playback of the content 124(o) is requested, the navigation module 126 may be executed on the client 104 to retrieve the content 124(o). The navigation module 126 may also restore the content 124(o) to the original encoded format as received from the content provider 102. For example, when the content 120(k) is recorded in the database 122 to form content 124(o), the content 120(k) may be compressed. Therefore, when the navigation module 126 retrieves the content 124(o), the content 124(o) is decompressed for rendering by the display device 110.

The navigation module 126 may also be executed on the client 104 to retrieve content 120(k) stored on the head end 116. For example, the navigation module 126 may communicate with a content module 128 that is executable on a distribution server 130 to cause recordation of content 112(j) received from the content provider 102 as content 120(k). In this instance, the content module 128 provides network digital video recorder (NDVR) functionality in a manner similar to a DVR. For instance, the content module 128 may support one or more trick modes to fast forward, pause, perform slow-motion playback, and so on in a manner similar to playback of the content 124(o) that is stored locally on the client 104. The navigation module 126 may also communicate with the content module 128 to order on-demand content (e.g., VOD), PPV content, and so on. Thus, the environment 100 may support a wide variety of content, such as VOD, PPV, locally-stored content 124(o), remotely-stored content 120(k), television programs, video games, music, and so on.

To navigate through this wide variety of content to locate a particular content item of interest (e.g., locally on the client 104, remotely from the head end 116, and so on), the environment 100 may support electronic program guide (EPG) functionality. For instance, the head end 116 may also include a plurality of EPG data 132(m), where "m" can be any integer from one to "M". The plurality of EPG data 132(m) is stored in an EPG database 134 for communication to the client 104. Although illustrated separately, the EPG database 134 and the content database 118 may be implemented utilizing the same system. In an implementation, the EPG data 132(m) is broadcast utilizing a carousel file system. The carousel file system repeatedly broadcasts the EPG data 132(m) over an out-of-band (OOB) channel to the client 104 over the network 106. The client 104 may then store the broadcast EPG data 132(m) received over the network 106 as EPG data 136(n), where "n" can be any integer from one to "N", in a database 138. To generate an EPG 140, the client 104 executes an EPG module 142 that examines and configures the EPG data 136(n) into a form that suitable for output to and rendering by the display device 110. Additionally, the EPG 140 may be configured to describe content that is provided from various locations, such as the content 120(k) available from the head end 116, content 124(o) stored locally on the client 104, and so on.

In another implementation, the EPG 140 is formed from the EPG data 132(m) at the head end 116 and then distributed to the client 104. For example, the head end 116 may also include an EPG module 144 that is executable on the distribution server 130 to generate the EPG 140 from the EPG data 132(m). The EPG 140 may be configured in a variety of ways through execution of the EPG module 144 at the head end 116, such as a particular EPG for each particular client that is communicatively coupled to the head end 116, a generic EPG representing each item of content 120(k) (which will also be referred to in the following discussion as a "content item"), and so on. Distribution from the head end 116 to the client 104 may be accommodated in a number of ways, including cable, RF, microwave, digital subscriber line (DSL), and satellite.

Either one or both of the EPG modules 142, 144 may be executed to search EPG data 136(n), 132(m) to locate a particular content item and/or channel of interest. For example, the EPG data 132(m) may include content metadata 146(m), channel metadata 148(m), and schedule data 150(m). Content metadata 146(m) is configured to describe one or more characteristics of a corresponding content item. Likewise, channel metadata 148(m) is configured to describe one or more characteristics of a corresponding channel. Channels may be configured in a variety of ways, and include what is also referred to as "sub-channels", which may be utilized to provide alternate-audio version of content, wide-screen versions of content items, and so on.

Schedule data 150(m) is utilized to describe when the content items described in the content metadata 146(m) are available via the channels described via the channel metadata 148(m). The EPG module 144, when executed may search the content metadata 146(m) as well as the channel metadata 148(m) to locate content and channels, respectively, that correspond to a search request. Further discussion of EPG data may be found in relation to FIG. 2, while further discussion of execution of the EPG modules may be found in relation to FIG. 3.

Generally, any of the functions described herein can be implemented using software, firmware (e.g., fixed logic circuitry), manual processing, or a combination of these implementations. The terms "module," "functionality," and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices, further description of which may be found in relation to FIG. 2. The features of the searching strategies described below are platform-independent, meaning that the searching strategies may be implemented on a variety of commercial computing platforms having a variety of processors.

Figure 2:
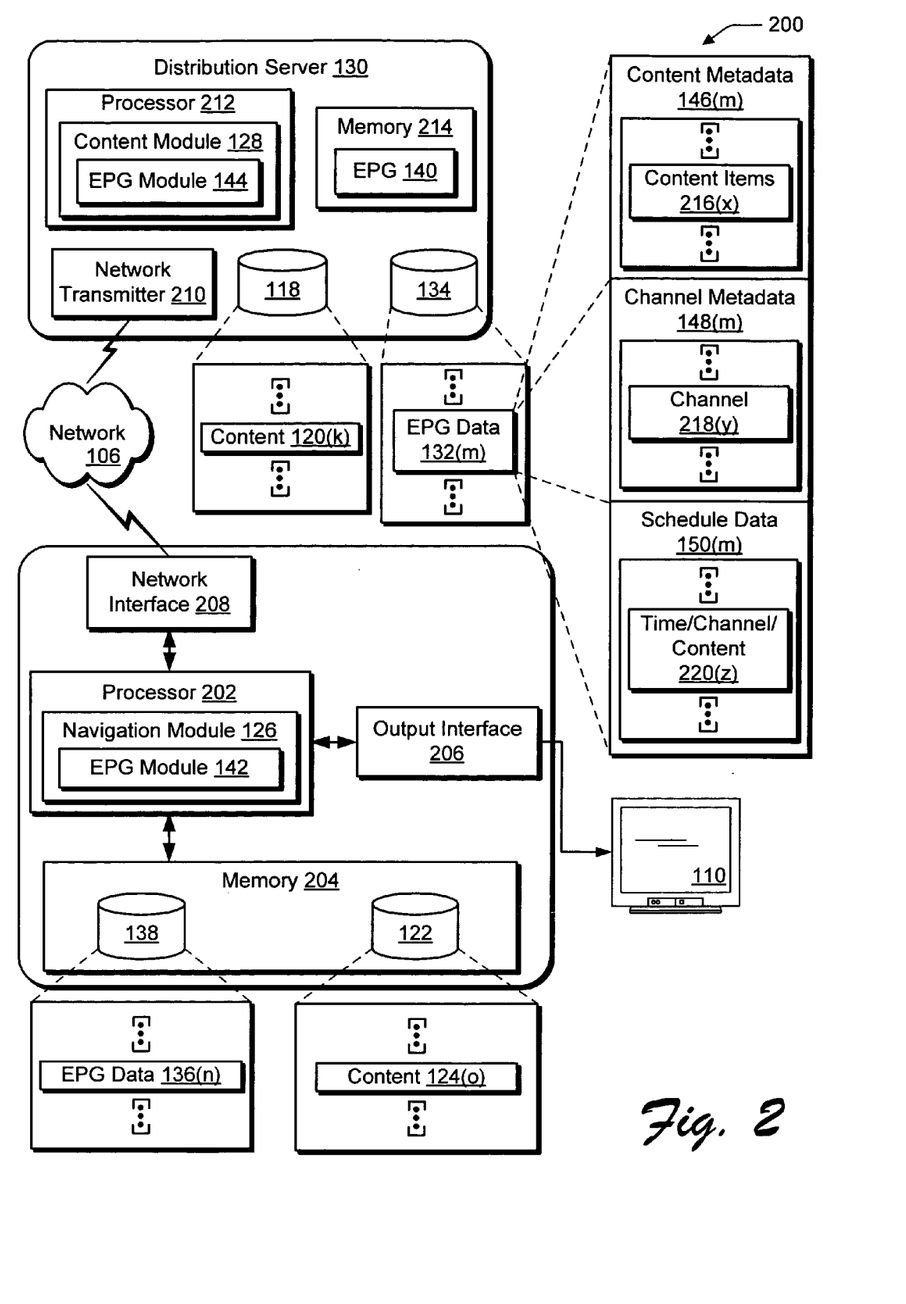
FIG. 2 is an illustration of an exemplary implementation of a system showing a distribution server and the client of FIG. 1 in greater detail.

FIG. 2 is an illustration of an exemplary implementation of a system 200 showing the distribution server 130 and the client 104 of FIG. 1 in greater detail. The client 104 includes a processor 202 and memory 204. The navigation module 126 is illustrated as being executed on the processor 202 and is storable in memory 204. The database 122, which is utilized to store the plurality of content 124(o), is illustrated as included in the memory 204. Likewise, the database 138 which is used to store the plurality of EPG data 136(n) is also illustrated as included in the memory 204. Although illustrated together, the databases 122, 138 may be implemented as stand-alone devices. For example, the databases 122, 138 may be respectively implemented as a hard disk drive and RAM, both may be configured as RAM, one may be configured as a removable memory device, and so forth.

As shown in the environment 100 of FIG. 1, the client 104 may obtain content from a variety of sources. For example, the client 104 may execute the navigation module 126 to retrieve content 124(o) from the database 122. The retrieved content 124(o) may then be output using an output interface 206 for rendering on the display device 110. The client 104, through execution of the navigation module 126, is also capable of requesting content 120(k) from the distribution server 130 over the network 106. The distribution server 130 is represented pictorially as including the database 118 having the plurality of content 120(k) for streaming over a network 106. The distribution server 130 may provide EPG data 132(m) from the database 134 that describes content available from the content provider 102 of FIG. 1.

The navigation module 126, when executed on the processor 202, may send a request via the network 106 to the distribution server 130 to request content 120(k) for streaming over the network 106, such as a PPV movie, VOD, and so forth. To communicate using the network 106, the client 104 includes a network interface 208 to communicatively couple the client 104 with the distribution server 130. As previously described, the network 106 may support two-way communication between the distribution server 130 and the client 104. Additionally, the network 106 can be any type of network, using any type of network topology and any network communication protocol, and can be represented or otherwise implemented as a combination of two or more networks including, for example, microwave, satellite, and/or data networks, such as the Internet. Furthermore, the network 106 may be capable of transmitting and receiving wired or wireless media using any broadcast format or broadcast protocol.

The distribution server 130 is illustrated as including a network transmitter 210 (hereinafter "transmitter"). The transmitter 210 may distribute the content 120(k) from the database 118, the EPG data 132(m) from the database 134, and so on. In alternate implementations, the distribution server 130, database 118, database 134, and the transmitter 210 may be implemented as one or more distinct components, locally as part of the head end 116 and/or content provider 102 of FIG. 1, or remotely as part of another distinct system. For instance, although the distribution server 130 is shown as including the EPG module 144 and content module 128 (which are executable for distribution of content 120(k), distribution of the EPG data 132(m), and/or generation of the EPG 140 as previously described), each component and its corresponding functionality may be implemented via a distinct device, such as a server. Accordingly, the distribution server 130 may represent a plurality of servers which provide the functionality.

The distribution server 130 also includes a processor 212 and memory 214. The content module 128 is illustrated as including the EPG module 144, which are both illustrated as being executed on the processor 212 and are storable in memory 214. The EPG module 144 is illustrated as within the content module 128 to portray that both modules may be implemented together, although both modules may also be implemented separately as "stand-alone" modules as shown in FIG. 1.

The content module 128 may also control distribution of the content 120(k) over the network 106 as previously described. For instance, the content module 128 may receive a request from the client 104 to receive the content 120(k). The content module 128 processes the request, such as to determine whether the client 104 is permitted to receive the content 120(k) (e.g., the client 104 has obtained conditional access rights to the content), obtain billing information from the client 104, locate the requested content from the plurality of content 120(k), and so on. If the client 104 is permitted to receive the content 120(k), the content module 128 may be executed to stream the content 120(k) to the client 104 over the network 106 by using the transmitter 210. In this instance, the content 120(k) is provided from the distribution server 130 in response to the request, and therefore is provided "on-demand" to the client 104. Examples of on-demand content items include VOD, video games, content that is locally stored via a DVR or remotely via a NDVR, and so on.

The content module 128, when executed in this example, may also control distribution of the EPG data 132(m) from the database 134 over the network 106. EPG data 132(m) may include any data that may be utilized to generate the EPG 140, such as obtained from the content provider 102 which describes the provided content, metadata included with content 124(o) stored on the database 138 on the client 104 as previously described in the DVR example, and so on.

The EPG data 132(m), for instance, may be configured to include content metadata 146(m), channel metadata 148(m), and schedule data 150(m) as previously described. Content metadata 146(m) includes data that describes characteristics of a particular one of a plurality of content items 216(x), where "x" can be any integer from one to "X". For example, content metadata 146(m) for content item 216(x) may include a content title, detailed description of the content item, content genre, actors appearing in the content item, rating (e.g., PG, G, Mature, and so on), plot, whether the content item supports closed captioning, whether the content item is interactive, and other descriptive information that corresponds to the content item itself. Channel metadata 148(m) includes data that describes characteristics of a particular one of a plurality of channels 218(y), where "y" can be any integer from one to "Y". For example, channel metadata 148(m) may describe a call sign (e.g., KXYZ) of the respective channel 218(y), a title (e.g., "The Fried Food Channel") of the respective channel 218(y), a genre (e.g., sports, news, and so on), a detailed description of the respective channel 218(y), the owner of the respective channel 218(y), and so on.

Schedule data 150(m) includes a plurality of time/content/channel 220(z) entries, where "z" can be any integer from one to "Z". Each of the time/content/channel 220(z) entries describes a particular time, at which, a corresponding one of the plurality of content items 216(x) is available via a corresponding one of the plurality of channels 218(y). Thus, the schedule data 150(m) may be utilized to "link" the content metadata 146(m) with the channel metadata 148(m) for generating the EPG 140.

The EPG module 144, when executed, utilizes the EPG data 132(m), and more particularly the content metadata 146(m), channel metadata 148(m), and schedule data 150(m) to generate the EPG 140. Once displayed, a user may interact with the EPG 140 to search the EPG data 132(m) for particular content items 216(x) and/or channels 218(y) of interest, further discussion of which may be found beginning in relation to FIG. 3.

Exemplary Procedures

The following discussion describes searching of EPG data that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks.

Figure 3:
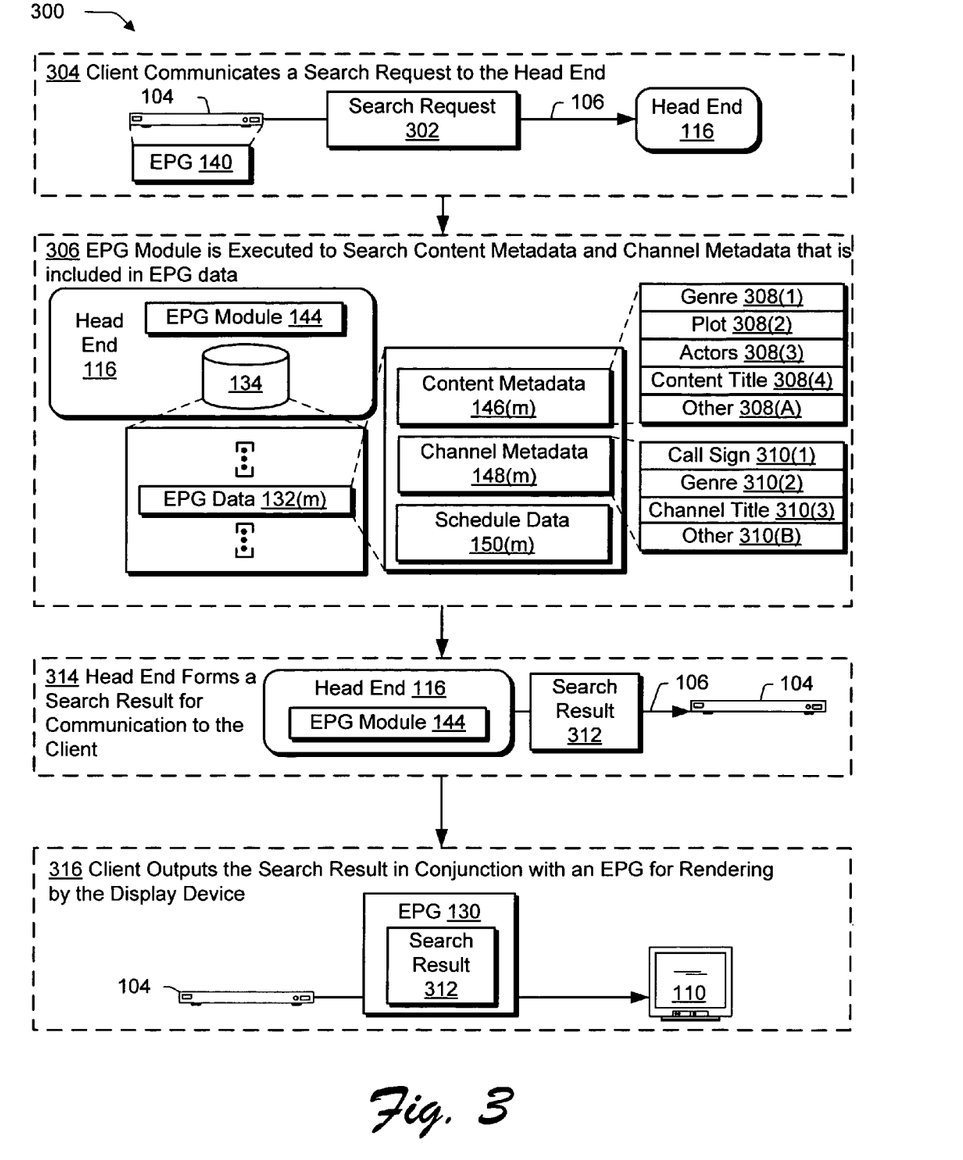
FIG. 3 is a flow diagram depicting a procedure in an exemplary implementation in which both content metadata and channel metadata, which collectively provide EPG data, are searched in response to a search request received from a user through interaction with an EPG.

FIG. 3 is a flow diagram depicting a procedure 300 in an exemplary implementation in which both content metadata 146(m) and channel metadata 148(m) are searched in response to a search request received from a user through interaction with an EPG. In this implementation, searching will be described that is performed through execution of the EPG module 144 on the distribution server 130. It should be noted that similar searching may also be performed locally on the client, such as through execution of the EPG module 142 of FIG. 1.

First, a client 104 communicates a search request 302 to a head end 116 over a network 106 (block 304). The search request 302 may be formed and communicated in a variety of ways. For example, the search request may be entered by the user through use of an input device, such as a keyboard, to formulate the search. In another implementation, the search request may be formed through interaction by the user with the EPG 140 when output by the client 104, further discussion of which may be found in relation to FIG. 4.

The head end 116, upon receipt of the search request 302, executes the EPG module 144 to search EPG data 132(m), and more particularly to search content metadata 146(m) and channel metadata 148(m) that is included in the EPG data 132(m). For example, the head end 116 may include a database 134, as previously described in relation to FIG. 1, which includes a plurality of EPG data 132(m). The EPG data 132(m) may include content metadata 146(m), channel metadata 148(m), and schedule data 150(m), each of which is compartmentalized to be separate, one from another. For instance, the content metadata 146(m) may be downloaded and stored on the head end 116 separately from the channel metadata 148(m).

When searching the EPG data 132(m), the EPG module 144 may compare the search request 302 to a plurality of characteristics of the content metadata 146(m) and/or the channel metadata 148(m) to find a match. For instance, the content metadata 146(m) may describe a genre 308(1), plot 308(2), actors 308(3), content title 308(4), and other 308(A) characteristics of a particular content item. Likewise, the channel metadata 148(m) may describe a plurality of characteristics of a particular channel, such as a call sign 310(1), genre 310(2), channel title 310(3), and other 310(B) such characteristics. The EPG module 144 may compare text, such as alphabetic characters, included in the search request 302 with text describing the characteristics 308(1)-308(A), 310(1)-310(B) of the content and channels, respectively, to find corresponding content and channels. In an implementation, the EPG module 144 may also determine when the described content items that correspond to the located content metadata 146(m) are available by examining the schedule data 150(m).

Based on the search, the head end 116 executes the EPG module 144 to form a search result 312 for communication to the client 104 over the network 106 (block 314). For example, the EPG module 144 may be included within a server module that is configured to form and communicate a stream of packets over the network 106 to the client 104. In the illustrated implementation, the client 104 then outputs the search result 312 in conjunction with an EPG 140 for rendering by the display device 110 (block 316). For example, the search result 312 may include a plurality of representations of channels and content items that were located during the search. The plurality of representations may be configured to enable the user to navigate to the represented item, such as to tune to a represented channel, load a represented content item from the database 122 of FIG. 1, and so on. Thus, the search module 144 may be executed to search both content and channel metadata 146(m), 148(m) to locate channels and/or content items of interest. As previously described, the search request 302 may be formed in a variety of ways, an example of which may be found in relation to the following illustration.

Figure 4:
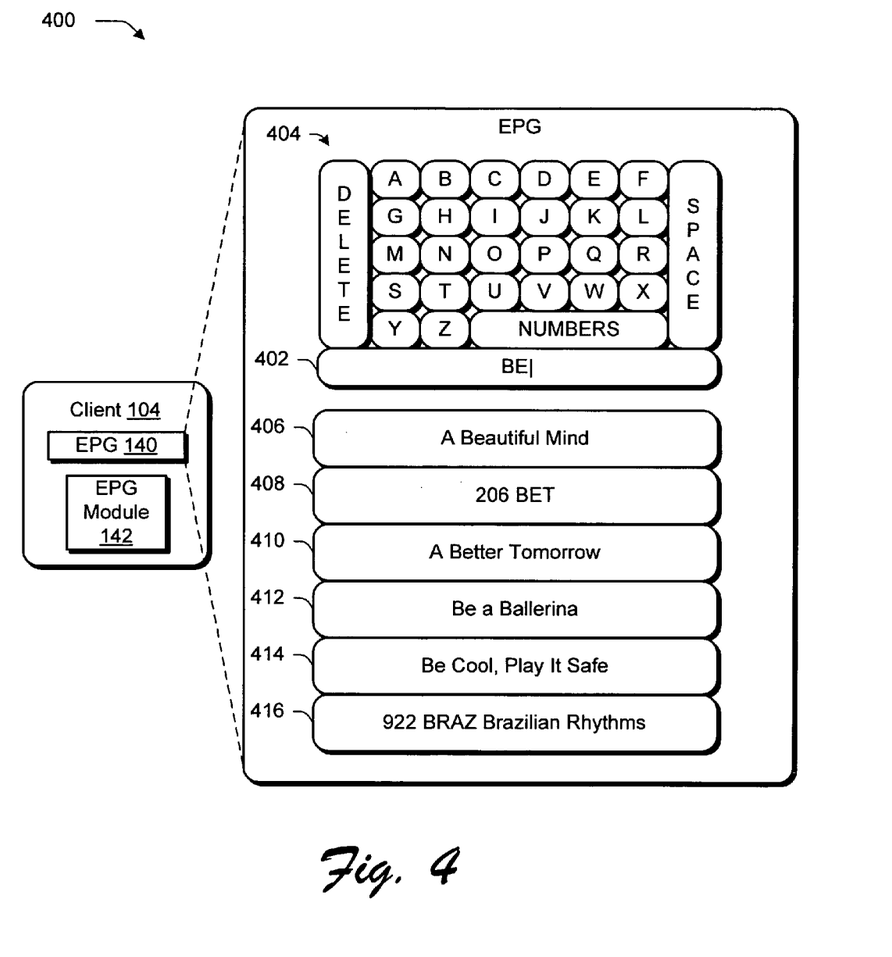
FIG. 4 is an illustration of an exemplary implementation in which the client of FIG. 3 outputs the EPG, which includes a search window configured for interaction by a user to form the search request.

FIG. 4 is an illustration of an exemplary implementation in which the client of FIG. 3 outputs the EPG 140, which includes a search window 402 configured for interaction by a user to form the search request 302. The EPG 400 of FIG. 4 is configured for output in a "10' experience". For example, a desktop computer is generally used by a user while sitting close to a display device. The user may utilize a mouse and keyboard connected to the desktop computer to interact with one or more applications that are being executed on the desktop computer. Because of the proximity between the user and the display device, this is referred to as a "2' experience" (e.g., a distance of about two (2) feet). Clients may also be configured for use in a more casual setting, such as a set-top box in a living room. To interact with the set-top box, the user may utilize a remote control. Because of the distance between the user and the display device, this scenario is referred to as a "10' experience". Traditional EPGs that are configured for the 10' experience, however, generally require a separate search page to search the EPG data. Therefore, a user utilizing a traditional EPG is required to leave an EPG guide page, which includes representations of content items, to access a dedicated search page to perform the search. This navigation between pages results in inconvenience to the user and consequent underutilization of the search feature. Accordingly, the EPG 400 includes a search window 402 such that the user does not need to leave an EPG guide page to perform a search.

To enter text via the EPG 400, for instance, a display of a keyboard 404 may be provided. For instance, a user may enter alphabetic text by selecting the representations of letters included in the keyboard 404, an example of which is illustrated in FIG. 4 as "BE". Alternatively, a mobile phone text entry system may be used to allow users to enter text quickly using the commonly used system employed by mobile devices.

Upon receipt of the alphabetic text "BE", the EPG module 144 may search EPG data having content and channel metadata (e.g., EPG data 132(m) and/or EPG data 136(n) of FIG. 1) to find content items and channels which correspond to the alphabetic text. It should be noted, however, that the searching may also be dynamically performed as text is entered. For example, a search may begin once the letter "B" is entered and the results of the search displayed adjacent to a search window. These results may then be subsequently narrowed with the input of a next character, e.g., "E", and displayed along with the search window. Thus, the user may receive immediate feedback regarding the search as the search is being entered.

In the illustrated example, the EPG module 144 locates content items and channels which are described in the EPG 140 utilizing a plurality of representations. The illustrated EPG 140 includes representations of a movie "A Beautiful Mind" 406, a channel "206 BET" 408, a television program "A Better Tomorrow" 410, an infomercial "Be a Ballerina" 412, a public service announcement "Be Cool, Play it Safe" 414, and a streaming audio channel "922 BRAZ Brazilian Rhythms" 416. Thus, in this example each of the representations includes at least one of the entered textual letters. Further, the EPG module 142 may order the representations as shown based on how much of the represented channel and/or content item corresponds to the search request. This is shown in FIG. 4 through illustration of the streaming audio channel "922 BRAZ Brazilian Rhythms" 416 as last in the list of representations since the representation does not include the letter "E" as entered in the search window 402. In another implementation, the EPG may automatically scroll to the representation which corresponds to the entered text in the text entry window 402. For example, a user might not be able to remember a channel number, but does remember a call sign of the channel. Therefore, the user can take advantage of the adjacent search window 402 by entering all or part of the call sign of the channel. In response to the entry, the EPG may automatically scroll to a representation of the channel which corresponds to the entry. Thus, a user may interact with the EPG to quickly navigate even when using an input device that is configured for the 10' experience, such as a television remote control, or for other system having limited display space, such as a wireless phone. Although use of a search window 402 which is displayable concurrently with a plurality of representations of content items and/or channels has been described, a variety of other input techniques may be utilized to input the search request, another example of which may be found in relation to the following figure.

Figure 5:
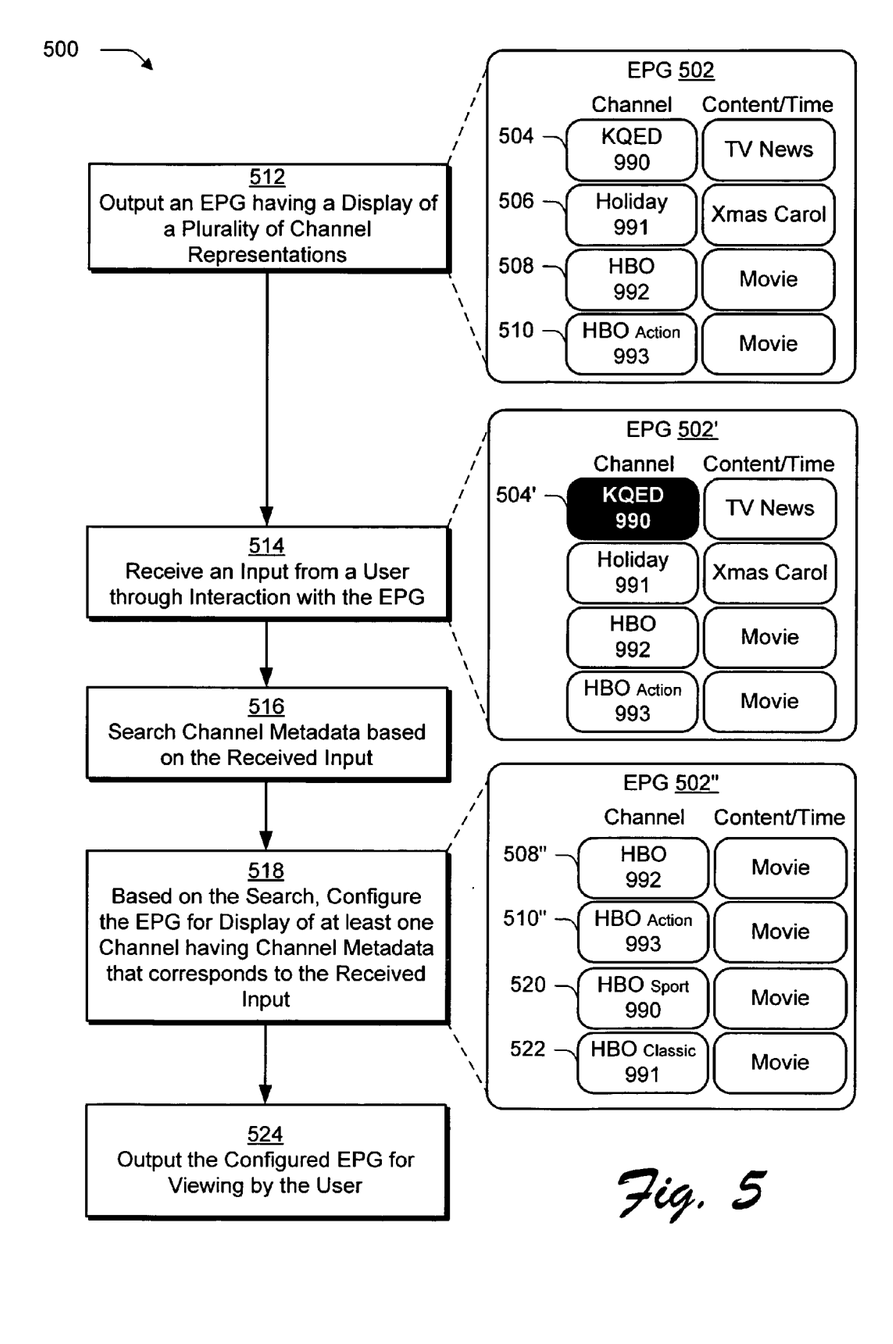
FIG. 5 is a flow diagram depicting a procedure in another exemplary implementation in which a search request and a search result are formed through interaction by a user with an EPG.

FIG. 5 is a flow diagram depicting a procedure 500 in another exemplary implementation in which a search request and a search result are formed through interaction by a user with an EPG. A client outputs an EPG 502 having a display of a plurality of channel representations 504-510 (block 512). In the illustrated EPG 502, the plurality of channel representations 504-510 are displayed in a column having a corresponding heading "Channel". Each of the channel representations 504-510 displays a call sign or title of the represented channel and a number of the represented channel. For instance, representation 504 includes the text "KQED 990", representation 506 includes the text "Holiday 991", representation 508 includes the text "HBO 992", and representation 510 includes the text "HBO Action 993". The EPG 502 is also illustrated as including a plurality of representations 512 of corresponding content items that are available via the respective channels.

The EPG may then receive an input from a user through interaction with the EPG (block 514) which is illustrated as EPG 502'. For example, the user may utilize a television remote control to select the representation 504'. Representation 504' is illustrated as a negative image of corresponding representation 504 of EPG 502 to depict the selection. The user may then enter alphabetic text while the representation 504' is selected, such as through use of text entry keys on an input device.

As previously described, an EPG module may then be executed to search channel metadata based on the received input (block 516). Based on the search, the EPG 502' is configured to form EPG 502" for display of at least one channel having channel metadata that corresponds to the received input (block 518). For instance, the user may have entered the alphabetic characters "HB" while channel representation 504' was selected. Therefore, the EPG module may interpret from this action that the user wishes to search for a particular channel and thus search channel metadata for one or more channels which satisfy the search request. Representations 508", 510", 520, 522 of channels which satisfy the search request may then be output in the configured EGP 502" for viewing by the user (block 524). Although entry of alphabetic characters via a search window and through selection of a representation has been described, a wide variety of other input techniques and display techniques may be employed without departing from the spirit and scope thereof. For example, a user may enter a call sign of a channel number in the search window 402 of FIG. 4 as previously described, which causes the channel lineup to automatically scroll to the channel having the entered call sign.

Figure 6:
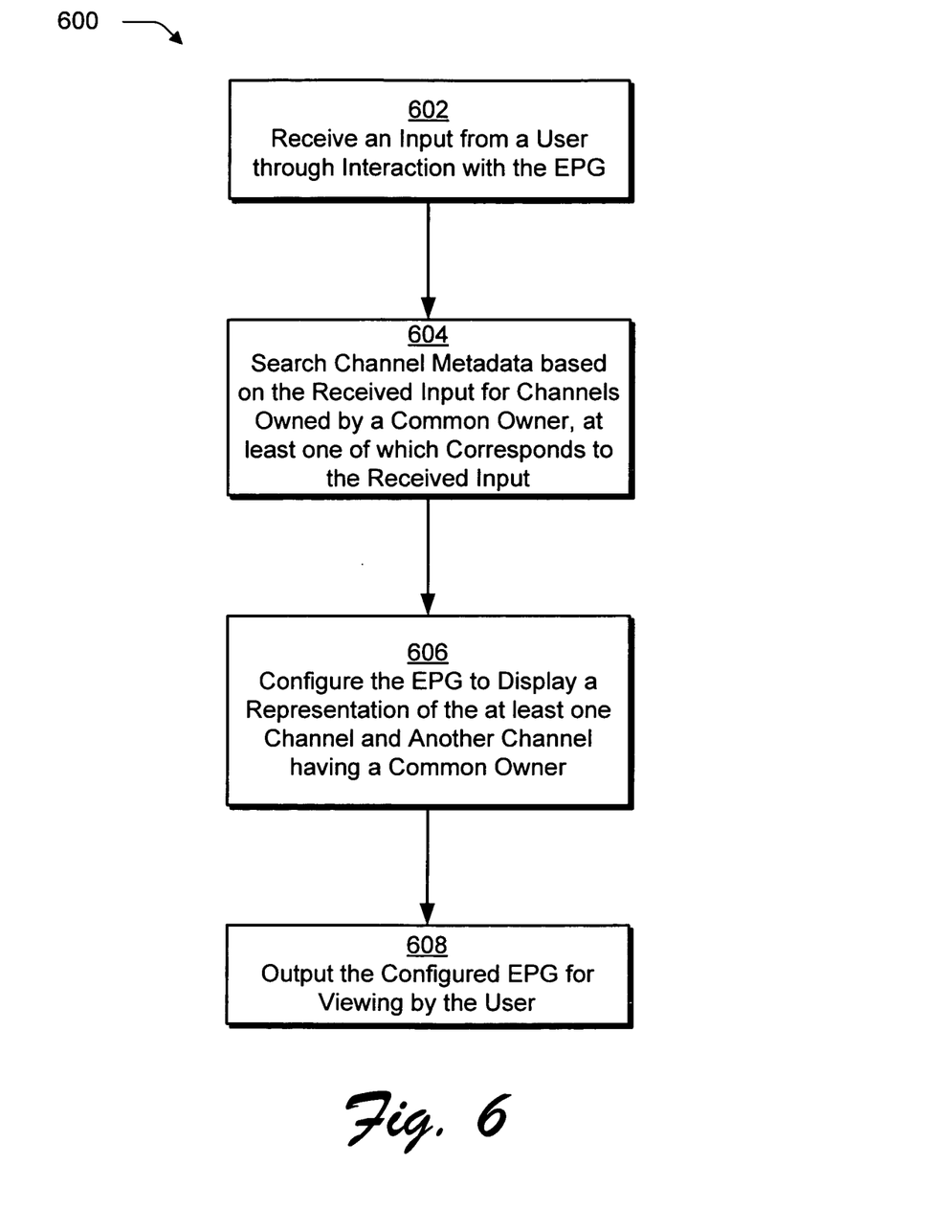
FIG. 6 is a flow diagram depicting a procedure in an exemplary implementation in which a result of a search of EPG data includes channels having a common owner.

FIG. 6 is a flow diagram depicting a procedure 600 in an exemplary implementation in which a result of a search of EPG data includes channels having a common owner. In the previous implementations, channel metadata was searched to locate channels which correspond to a search request. The channel metadata may also be searched to promote "branding", such as channels which share a common owner. For instance, an input may be received from a user through interaction with an EPG (block 602) as previously described. A search may be performed utilizing channel metadata and based on the received input for channels owned by a common owner such that at least one of the channels corresponds to the received input (block 604).

A search, for example, may be performed for "satellite news". As a result of the search, a news channel "Satellite News" may be located in channel metadata. The EPG module which performs the search may also locate other channels which are also owned by the owner of the "Satellite News" channel, such as "Satellite Headlines" Channel and a channel titled "In Their Own Words". Thus, the search result may include a channel which corresponds to the received input (e.g., "Satellite News" channel) as well as other channels which are commonly owned (e.g., "Satellite Headlines" channel and "In Their Own Words" channel). As before, the EPG may then be configured to display a representation of the at least one channel that corresponds to the search request and another representation of another channel that is commonly owned (block 606). The configured EPG may then be output for viewing by a user (block 608). In this way, the channel metadata may be utilized to promote brands (i.e., families) of channels that may be of interest to the user and are presented to the user without the user having to search for each commonly owned channel individually.

Conclusion

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method implemented by one or more processors executing instructions stored in one or more memories, the method comprising:

displaying, at a client device, an electronic program guide (EPG) that comprises schedule and channel information for a plurality of content items, said EPG including a search window that is concurrently displayed with the schedule and channel information, the search window for receiving entry of a plurality of alphabetic characters from a user to update the concurrently displayed schedule and channel information in response to entry of each alphabetic character of the plurality of alphabetic characters;

receiving alphabetic search input from the user describing a channel of interest by entry of the plurality of alphabetic characters into the search window;

communicating a search request including the alphabetic search input over a network to a head end to direct the head end to search channel metadata based upon the alphabetic search input to determine a relevant channel by searching channel metadata that describes channel characteristics of channels that are accessible to the user via the EPG, and also direct the head end to search content metadata that describes content characteristics of particular content items, wherein the channel metadata describing the channel characteristics including channel call signs, channel owners, and channel titles is stored at the head end separately from the content metadata describing the content characteristics, wherein as a result of directing the head end to search channel metadata, searching by the head end further comprises determining other channels which are also owned by an owner of the relevant channel that satisfies the search input;

receiving a result of the searching from the head end;

outputting the results of the searching in conjunction with the EPG, the results comprising a redisplay of the EPG to present a list displayed in the EPG including a representation of the relevant channel that satisfies the search input and representations of one or more channel identifiers determined to be relevant to the alphabetic search input, the one or more channel identifiers including the other channels which are also owned by the owner of the relevant channel that satisfies the search input, along with one or more names of one or more content items that are determined to be relevant to the alphabetic search input;

receiving a highlight input from the user describing a selected channel representation displayed in the EPG without highlighting an associated content item;

receiving a new alphabetic search input into the search window while the selected channel representation is highlighted;

interpreting from the highlight input that the user wishes to search for a particular channel rather than the associated content item; and communicating the search request over the network to the head end for searching only the channel metadata and not the content metadata based on the received search input for one or more channels that satisfy the search input.

2. A method as described in claim 1, wherein:

the one or more channel identifiers are listed as separate search result items on separate lines in the list from the one or more names of the one or more content items listed as separate search results on separate lines in the list from the channel identifiers, the one or more content items listed in the list are not available for viewing on channels corresponding to the one or more channel identifiers listed in the list; and the one or more channel identifiers and the one or more names of the one or more content items are presented in the list in a descending order based on how closely the one or more channel identifiers and the one or more names of the one or more content items resemble the alphabetic search input.

3. A method as described in claim 1, further comprising:

in response to the interpreting, automatically scrolling to a channel in the EPG that matches the new alphabetic search input.

4. A method as described in claim 1, wherein:

the alphabetic search input is a call sign of a channel entered in the search window, and the outputting the result causes a channel lineup of the EPG to automatically scroll for highlighting the representation of the relevant channel and having the entered call sign.

5. A method as described in claim 1, wherein:

the alphabetic search input corresponds to at least a portion of a call sign of the channel, and the outputting result includes a channel call sign and channel number displayed as a search result in the list displayed in the EPG independent of any content item displayed as a search result in the list displayed in the EPG.

6. A method as described in claim 1, wherein one or more of the other commonly owned channels output as the result do not have names or call signs that correspond to the received alphabetic search input.

7. A method as described in claim 1, wherein the channel characteristics further comprise channel genres.

8. A method as described in claim 1, wherein the content metadata describes the content characteristics of a plurality of content items, the content characteristics selected from the group consisting of:

content title;
detailed content description;
genre;
plot;
rating;
closed captioning support; and
detailed channel description.

9. One or more computer readable memory devices comprising computer executable instructions, implemented at least in part by a computer, that direct the computer to perform the method as described in claim 1.

10. A method implemented by one or more processors executing instructions stored in one or more memories, the method comprising:

providing, by a head end including one or more of the processors, electronic program guide (EPG) information to a client device for displaying of an EPG by the client device, wherein the EPG comprises schedule and channel information for a plurality of content items, and the EPG further displays a search window concurrently with the schedule and channel information, the search window for receiving entry of a plurality of alphabetic characters from a user to update the concurrently displayed schedule and channel information in response to entry of each alphabetic character of the plurality of alphabetic characters;

receiving, from the client device, a search request including an alphabetic search input comprising the plurality of alphabetic characters, entered via the search window displayed with the EPG for locating a channel of interest to a user;

searching, by the head end, EPG data for at least one channel that corresponds to the alphabetic search input, the EPG data including channel metadata that describes channel characteristics of channels accessible to the user via the EPG, the channel characteristics including channel call signs, channel genres, and channel titles, the head end also searching content metadata in the EPG data, the content metadata describing content characteristics of content items accessible to the user via the EPG, wherein the channel metadata describing the channel characteristics including the channel call signs, the channel genres, and the channel titles is stored at the head end separately from the content metadata describing the content characteristics, wherein the searching further comprises determining other channels which are also owned by an owner of the at least one channel that satisfies the alphabetic search input;

ordering results based in part on the similarity between the content metadata and the channel metadata and the alphabetic search input, and in part based on schedule data, the results including one or more channel identifiers and names of one or more content items that are determined to correspond to the alphabetic search input entered into the search window;

outputting, in conjunction with the EPG, a representation of the at least one channel that satisfies the search request, and representations of the other channels which are also owned by the owner of the at least one channel that satisfies the alphabetic search input, wherein one or more of the other channels do not have names or call signs that correspond to the received alphabetic search input;

receiving, from the client device, a highlight input describing a selected channel representation displayed in the EPG without highlighting an associated content item representation;

receiving, from the client device, while the selected channel representation is highlighted, alphabetic text as a new search input;

interpreting from the highlight input that the user wishes to search for a particular channel rather than an associated content item;

in response to the interpreting, searching the channel metadata and not the content metadata based on the new search input for one or more channels that satisfy the new search input; and displaying the one or more channels that satisfy the new search input.

11. A method as described in claim 10, wherein the channel characteristics further comprise channel owners that are searched as the channel metadata.

12. A method as described in claim 10, wherein:
the alphabetic search input corresponds to at least a portion of a call sign of a particular channel, and
the results include a corresponding channel call sign and channel number displayed as a search result in the EPG independent of any content item displayed as a search result.

13. A method as described in claim 10, wherein the alphabetic search input corresponds to at least a portion of a descriptive name of a particular channel, and results include the descriptive name of the particular channel.

14. A method as described in claim 10, wherein the outputting occurs upon entry of a first alphabetic character of the plurality of alphabetic characters into the search window, the method further comprising:
outputting a narrowed result of the searching upon entry of a second alphabetic character of the plurality of alphabetic characters into the search window that is concurrently displayed along with the schedule and channel information in the EPG.

15. A method as described in claim 14, wherein:
the result of the searching that is output upon entry of the first alphabetic character into the search window includes at least one search result with a first alphabetic character that is different from the first alphabetic character received from the user; and
the narrowed result of the searching that is output upon entry of the second alphabetic character into the search window includes at least one search result with a second alphabetic character that is different from the second alphabetic character received from the user.

16. A method as described in claim 10, wherein:
the providing the EPG includes providing an EPG configured to:
display a plurality of channel representations and a plurality of corresponding content item representations, wherein individual ones of the plurality of channel representations include a call sign or title of a represented channel; and
provide functionality for selecting a channel representation of the plurality of channel representations by highlighting only the channel representation of the plurality of channel representations displayed in the EPG without highlighting an associated content item representation; and
the EPG further configured to automatically scroll to a channel in the EPG that matches the alphabetic search input provided by the user while the channel representation of the plurality of channel representations is selected and highlighted as a result of the interpreting from the selection and highlighting of only the channel representation that the user wishes to search for a particular channel rather than a content item.

17. One or more computer readable memory devices comprising computer executable instructions, implemented at least in part by a computer, that direct the computer to perform the method as described in claim 10.

18. A method as described in claim 10, wherein the representations of the other channels are displayed with the representation of the at least one channel that satisfies the search request to promote brands of channels that are of interest to the user.

19. A method implemented by one or more processors executing instructions stored in one or more memories, the method comprising:
receiving, by one or more of the processors, an alphabetic search request that includes a plurality of alphabetic characters from a user via an electronic program guide (EPG) by entry of the plurality of alphabetic characters into a search window that is concurrently displayed in the EPG along with schedule and channel information for a plurality of content items, the search window for receiving entry of the plurality of alphabetic characters from the user to update the concurrently displayed schedule and channel information in response to entry of each alphabetic character of the plurality of alphabetic characters;
searching electronic program guide data including channel metadata and content metadata as a result of the receiving the alphabetic search request from the user to locate at least one channel that satisfies the alphabetic search request, the channel metadata and the content metadata stored separately on a head end in communication with the client device that receives the alphabetic search request from the user;
determining other channels which are also owned by an owner of the at least one channel that satisfies the alphabetic search request;
outputting, in conjunction with the EPG as a result of the alphabetic search request, a representation of the at least one channel that satisfies the alphabetic search request and representations of the other channels which are also owned by the owner of the at least one channel that satisfies the alphabetic search request, wherein one or more of the other channels do not have names or call signs that correspond to the alphabetic search request;
receiving, by the one or more of the processors, a highlight input describing a selected channel representation displayed in the EPG without highlighting an associated content item representation;
receiving, by the one or more of the processors, while the selected channel representation is highlighted, alphabetic text as a new search input;
interpreting from the highlight input that the user wishes to search for a particular channel rather than an associated content item;
in response to the interpreting, searching the channel metadata and not the content metadata based on the new search input for one or more channels that satisfy the new search input; and
displaying the one or more channels that satisfy the new search input.

20. A method as described in claim 19, wherein the representations of the other channels are displayed with the representation of the at least one channel that satisfies the alphabetic search request to promote brands of channels that are of interest to the user.

21. A method as described in claim 19, wherein the receiving, the searching, and the outputting are performed at a client.

22. One or more computer readable memory devices comprising computer executable instructions, implemented at least in part by a computer, that direct the computer to perform the method as described in claim 19.

23. A method as described in claim 19, wherein:
the alphabetic search request is a call sign of a channel entered in the search window, and
the outputting causes a channel lineup of the EPG to automatically scroll for highlighting the representation of the channel determined to be relevant and having the entered call sign.

24. A method implemented by one or more processors executing instructions stored in one or more memories, the method comprising:
displaying an electronic program guide (EPG) output having a plurality of channel representations, a plurality of corresponding content representations and a concurrently displayed search window, wherein individual ones of the channel representations of the plurality of channel representations includes a call sign or title of a represented channel, the search window for receiving entry of a plurality of alphabetic characters from a user to update the concurrently displayed plurality of channel representations and corresponding content representations in response to entry of each alphabetic character of the plurality of alphabetic characters;
selecting a selected channel representation of the plurality of channel representations by highlighting only the selected channel representation displayed in the EPG without highlighting an associated content item representation;
entering alphabetic text by a user as a search input into the search window while only the selected channel representation is selected and highlighted;
interpreting from the selection and highlighting of only the selected channel representation that the user wishes to search for a particular channel rather than a content item;
based at least in part on the interpreting, searching channel metadata stored in a computer at a head end separately from content metadata stored in the computer at the head end, the channel metadata describing channel characteristics for the selected channel representation including channel call signs, channel genres, and channel titles, the channel metadata including a genre and a detailed description of the selected channel representation; and
updating the EPG for display of at least one channel representation having channel metadata which corresponds to the received search input entered by the user via the search window by automatically scrolling to a channel representation in the EPG that matches the search input received as a result of the interpreting from the selection and highlighting of only the selected channel representation that the user wishes to search for the particular channel rather than the content item.

25. A method as described in claim 24, wherein the updating is performed without configuring the electronic program guide for display of a new page without the pluralities of representations.

26. A method as described in claim 24, wherein:
the entered alphabetic text is a channel call sign, and the updating is performed by scrolling a display of the electronic program guide such that the at least one channel representation displayed corresponds to the channel call sign entered via the search window.

27. One or more computer readable memory devices comprising computer executable instructions, implemented at least in part by a computer, that direct the computer to perform the method as described in claim 24.

28. One or more computer readable memory devices comprising computer executable instructions, implemented at least in part by a computer, that direct the computer to output an electronic program guide (EPG) having a concurrent display of:
- a plurality of representations of content items;
- a plurality of channel representations of broadcast channels that provide content items for viewing;
- a search window for locating at least one said broadcast channel that corresponds to a search request received from a user, the search window for receiving entry of a plurality of alphabetic characters from the user to update the concurrently displayed plurality of representations of content items and plurality of channel representations in response to entry of each alphabetic character of the plurality of alphabetic characters;
- the EPG being configured to:
  - enable the user to select a selected channel representation of the broadcast channel by highlighting only the selected channel representation displayed in the EPG without highlighting an associated content item, and enter alphabetic text as a search input into the search window while only the selected channel representation of the broadcast channel is selected and highlighted;
  - interpret from the selection and highlighting of only the selected channel representation that the search input is entered for searching for a particular broadcast channel rather than a content item;
  - search channel metadata stored at a head end separately from content metadata stored at the head end, the channel metadata describing channel characteristics including at least a channel owner, the search being based on the search input, and the searching being for one or more broadcast channels that satisfy the search input based on the interpretation from the selection and highlighting of only the selected channel representation that the search input is for searching for the particular broadcast channel rather than content item; and
  - automatically scroll to a channel in the EPG that matches the received search input as a result of the interpretation from the selection and highlighting of only the selected channel representation that the search input is for searching for the particular broadcast channel rather than the content item.

29. One or more computer readable memory devices as described in claim 28, wherein the electronic program guide is configured for output in a 10' experience.

30. One or more computer readable memory devices as described in claim 28, wherein the electronic program guide is configured for output by a wireless phone.

31. One or more computer readable memory devices as described in claim 28, wherein the plurality of representations of content items are provided by the content metadata stored in the head end in communication with a client device that displays the EPG, and the plurality of representations of the broadcast channels are provided by the channel metadata stored in the head end in communication with the client device, wherein the content metadata is stored separately at the head end from the channel metadata.

32. One or more computer readable memory devices comprising computer executable instructions, implemented at least in part by a computer, that direct the computer to carry out steps comprising:
- receiving, from a client device, an alphabetic input that includes a plurality of alphabetic characters entered into a search window that is concurrently displayed with schedule information in an electronic program guide (EPG), the alphabetic search input describing one or more identifying characteristics of a channel, the client device displaying the EPG in accordance with EPG data received from the computer, the EPG data including channel metadata and content metadata, wherein the channel metadata, which describes channel characteristics including channel call signs, channel genres, and channel titles, is stored by the computer separately at a head end from the content metadata stored by the computer at the head end in communication with the client device, the content metadata describing content characteristics including at least content titles, the search window to update the concurrently displayed schedule information in response to entry of each alphabetic character of the plurality of alphabetic characters;
- searching the channel metadata for at least one channel that meets the identifying characteristics, wherein the channel metadata describes a plurality of characteristics of particular channels, and searching the content metadata for at least one content item that corresponds to the alphabetic search input, wherein the content metadata describes a plurality of characteristics of particular content items; and
- outputting a result of the searching, via the EPG, that includes a plurality of channel titles or call signs and a plurality of names of content items determined to correspond to the alphabetic search input entered into the search window;
- providing the result to the client device for displaying the plurality of channel titles or call signs and the plurality of names of the content items in a list provided in the EPG, wherein the channel titles or call signs and names of the content items are displayed in the list in a descending order based on how closely the channel titles or call signs and the names of the content items resemble the alphabetic search input;
- navigating to a selected one of the plurality of channel titles or call signs and the plurality of names of the content items in a list;
- displaying the EPG with a plurality of channel representations, a plurality of corresponding content item representations and the search window simultaneously, wherein each of the channel representations includes a call sign, title or number of a represented channel;
- selecting one of the channel representations by highlighting only the selected channel representation displayed in the EPG without highlighting a displayed associated content item representation;
- entering alphabetic text by the user as new alphabetic search input into the search window while the channel representation is selected and highlighted and the displayed associated content item representations is not selected;
- interpreting from the selection and highlighting of only the channel representation and not the displayed associated content item representation that the user wishes to search for a particular channel rather than a content item;
- in response to interpreting that the user wishes to search for a particular channel rather than a content item, searching only the channel metadata and not the content metadata based on the received new search input for one or more channels that satisfy the new search input ; and
- automatically scrolling to a channel in the EPG that matches the received new search input as a result of the interpreting from the selection and highlighting of only the channel representation that that user wishes to search for a particular channel rather than a content item.

33. One or more computer readable memory devices as described in claim 32, wherein the outputting the result of the searching occurs upon entry of a first alphabetic character of the plurality of alphabetic characters into the search window, and further comprising outputting a narrowed result of the searching upon entry of a second alphabetic character of the plurality of alphabetic characters into the search window that is concurrently displayed along with the schedule information in the EPG.

34. One or more computer readable memory devices as described in claim 32, wherein:
the result of the search references the at least one channel separately from any content item; and
the result is output in conjunction with the EPG.

35. A computer comprising:
a processor; and
memory configured to maintain:
electronic program guide data having:
channel metadata that describes characteristics of a plurality of broadcast channels that provide content items for viewing;
content metadata that describes characteristics of a plurality of content items, the content metadata stored separately from the channel metadata; and
schedule data that describes when one or more said content items are available via a corresponding said broadcast channel; and
one or more modules that are executable on the processor to perform operations that include:
receiving a highlight input describing a selected channel representation displayed in the electronic program guide without highlighting an associated content item representation;
receiving, while the selected channel representation is highlighted, a plurality of alphabetic characters as an alphabetic search request describing a broadcast channel of interest to a user, wherein the plurality of alphabetic characters are input by a mobile phone text entry system;
interpreting from the highlight input that the user wishes to search for a particular channel rather than an associated content item;
searching the channel metadata as a result of receiving each alphabetic character of the plurality of alphabetic characters of the alphabetic search request to locate at least one said broadcast channel having a characteristic that conforms to the alphabetic search request entered by the user;
determining other channels which are also owned by an owner of the at least one broadcast channel having the characteristic that conforms to the alphabetic search request entered by the user;
forming a result of the alphabetic search request that references the at least one broadcast channel; and
outputting, in conjunction with the EPG as a result of the alphabetic search request, representations of the other channels which are also owned by the owner of the at least one broadcast channel having the characteristic that conforms to the alphabetic search request, wherein one or more of the other channels output as the result do not have names or call signs that correspond to the received alphabetic characters.

36. A computer as described in claim 35, further comprising a network transmitter configured to transmit the electronic program guide data to a client for output at the client.

37. A computer as described in claim 35, further comprising a network receiver configured to receive the electronic program guide data from over a network.

38. A computer as described in claim 35, wherein the characteristics described by the content metadata are selected from the group consisting of:
content title;
detailed content description;
genre;
plot;
rating;
closed captioning support; and
detailed channel description.

39. A computer as described in claim 35, wherein the characteristics described by the channel metadata that are searched in response to the alphabetic search request comprise:
channel call signs;
channel titles; and
channel genres.

40. A computer as described in claim 35, wherein at least one said content item is a television program.

41. A computer as described in claim 35, wherein the one or more modules are further executable to output the result of the search request to a client device for display at the client device in response to receiving the search request from the client device.

42. A computer as described in claim 35, wherein the searching is performed in response to a request formed through interaction by a user with the EPG using a remote control.

43. A computer as described in claim 35, wherein:
the channel metadata is stored on the head end separately from the content metadata stored on the head end, the channel metadata describing the characteristics of the plurality of broadcast channels including channel call signs, channel genres, and channel titles, the content metadata describing the characteristics of the plurality of content items including at least content titles.

* * * * *